United States Patent
Bothe et al.

(10) Patent No.: US 6,342,570 B1
(45) Date of Patent: Jan. 29, 2002

(54) CROSS-LINKABLE COPOLYMERS AND HYDROGELS

(75) Inventors: Harald Bothe, Wiesbaden; Achim Müller, Aschaffenburg; Bernhard Seiferling, Goldbach; Sharla Borghorst, Frankfurt am Main; John Golby, Aschaffenburg; Peter Hagmann, Erlenbach am Main; Peter Herbrechtsmeier, Königstein; Otto Kretzschmar, Einhausen, all of (DE)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 09/280,789

(22) Filed: Mar. 26, 1999

Related U.S. Application Data

(62) Division of application No. 08/942,097, filed on Oct. 1, 1997, now Pat. No. 5,936,052, which is a division of application No. 08/339,384, filed on Nov. 4, 1994, now Pat. No. 5,712,356.

(51) Int. Cl.$^7$ .................................................. C08F 26/08
(52) U.S. Cl. ........................ 526/264; 526/273; 526/287; 526/307; 526/317.1; 526/320; 526/328.5
(58) Field of Search ................................. 526/264, 273, 526/287, 307, 317.1, 320, 328.5, 332

(56) References Cited

U.S. PATENT DOCUMENTS

| | | | |
|---|---|---|---|
| 2,100,900 A | | 11/1937 | Fikentscher et al. .......... 526/87 |
| 3,949,021 A | * | 4/1976 | Kunitomo et al. .......... 260/895 |
| 4,141,934 A | | 2/1979 | Wingler et al. ............. 260/881 |
| 4,184,992 A | | 1/1980 | Hosaka ..................... 260/29.7 |
| 5,004,614 A | * | 4/1991 | Stainforth ..................... 424/78 |
| 5,035,891 A | * | 7/1991 | Runk et al. ................. 424/473 |
| 5,132,417 A | | 7/1992 | Potthoff et al. ............. 526/264 |
| 5,266,325 A | | 11/1993 | Kuzma et al. .............. 424/422 |
| 5,319,041 A | | 6/1994 | Zhang et al. ................. 526/73 |
| 5,362,830 A | | 11/1994 | Chuang et al. ............. 526/263 |
| 5,395,904 A | | 3/1995 | Zhang et al. ............... 526/264 |
| 5,712,356 A | | 1/1998 | Bothe et al. ................ 526/264 |

FOREIGN PATENT DOCUMENTS

| | | |
|---|---|---|
| EP | 0106650 | 10/1982 |
| EP | 2347499 | 9/1987 |
| EP | 418721 | 3/1991 |
| GB | 1323028 | 7/1993 |

\* cited by examiner

Primary Examiner—David W. Wu
Assistant Examiner—Tanya Zalukaeva
(74) Attorney, Agent, or Firm—R. Scott Meece; Robert J. Gorman

(57) ABSTRACT

The present invention describes novel statistical copolymers and the preparation and possible uses thereof. Copolymers are described that are water-soluble and cross-linkable and that comprise the copolymerization product of a monomer mixture consisting substantially of a vinyl lactam (a) and at least one further vinyl monomer (b) of a different type selected from the group consisting of hydrophobic, hydrophilic and functional vinyl monomers, wherein the monomers are present in the copolymer in the form of statistically distributed building blocks, and, if a functional vinyl monomer is present as a building block in the copolymer, that building block is, where appropriate, modified with a reactive vinyl monomer (c), the reactive vinyl monomer (c) being linked to a building block of a functional vinyl monomer with retention of its vinylic group and with the formation of a covalent bond.

11 Claims, No Drawings

CROSS-LINKABLE COPOLYMERS AND HYDROGELS

This application is a division of U.S. Ser. No. 08/942,097 filed Oct. 1, 1997, which is now U.S. Pat. No. 5,936,052, which is a division of U.S. Ser. No. 08/339,384 filed Nov. 4, 1994, which is now U.S. Pat. No. 5,712,356.

The present invention relates to novel copolymers based on vinyl lactams, the monomer building blocks of which have a statistical distribution, that are water-soluble and cross-linkable, and are, where appropriate, modified with reactive vinyl monomers, to processes for the preparation of the novel copolymers, to cross-linked water-insoluble copolymers, hydrogels and mouldings produced from the cross-linked water-insoluble copolymers, especially contact lenses, and to processes for the preparation of hydrogels and finished contact lenses using the said cross-linkable water-soluble copolymers.

Vinyl lactam copolymers, such as, for example, vinylpyrrolidone copolymers, have already been known for a relatively long time as material for contact lenses having a high water content. Scafilcon A and Surfilcon A are mentioned here as representative examples. They have proved very successful in practice owing to their high degree of wearer comfort.

U.S. Pat. No. 4,347,198 describes the manufacture of contact lenses where a hydrophilic component, for example N-vinylpyrrolidone, a hydrophobic component, for example methyl methacrylate, a cross-linking agent and an initiator are mixed in a solvent, for example DMSO, and then the whole is cross-linked in a mould. After extraction and equilibration in water, a soft hydrogel contact lens is obtained. Extraction with water is necessary because the solvent and unreacted vinyl monomers have to be removed. Since a polymer swells to different extents, for example in DMSO on the one hand and water on the other, the contact lens assumes its final size only at that stage.

EP 216 074 describes a process for the preparation of hydrogel contact lenses. There, a methacrylate-modified polyvinyl alcohol is used which is copolymerised in DMSO solution with vinyl monomers in a suitable casting mould, for example in the presence of a photoinitiator by irradiation with UV light for approximately 3 hours. After being removed from the mould, the contact lens is extracted with water or physiological saline solution in order to remove the DMSO and unreacted vinyl monomers. In this case too, the contact lens does not receive its final geometry until the final stage owing to the different influences of DMSO and water on its swelling behaviour.

Efforts are being made in various quarters to reduce the reaction times in polymer preparation in order to make lens manufacture more economical. EP 370 827 (Vistakon) describes, for example, the use of boric acid esters of certain difunctional alcohols as solvents for the polymerisation of, in the main, HEMA in a polystyrene casting mould. Polymerisation takes place in only 6 to 12 minutes, again in the presence of a photo-initiator by irradiation with UV light, and yields a gel which then has to be extracted with water.

One disadvantage of the previous processes for the manufacture of contact lenses is the laborious extraction with water or physiological saline solution, which precludes economical contact lens manufacture with short cycle times.

Another disadvantage of the previous processes is, as already mentioned, the relatively slow cross-linking speed in the preparation of polymers in the case of the prior art.

The present invention provides a remedy for those problems since it discloses statistical copolymers that are water-soluble and cross-linkable. The above-mentioned laborious extraction with water or physiological saline solution after cross-linking is omitted in the case of the present invention because cross-linking can be effected, for example, in water. The disadvantage of the relatively slow cross-linking speed is countered by using copolymers instead of monomers as starting material for the manufacture of contact lenses.

The present invention accordingly relates to a water-soluble cross-linkable copolymer comprising a copolymerisation product of a monomer mixture consisting substantially of a vinyl lactam (a) and at least one further vinyl monomer (b) of a different type selected from the group consisting of hydrophobic, hydrophilic and functional vinyl monomers, wherein the monomers are present in the copolymer in the form of statistically distributed building blocks, and, if a functional vinyl monomer is present as a building block in the copolymer, that building block is, where appropriate, modified with a reactive vinyl monomer (c), the reactive vinyl monomer (c) being linked to a building block of a functional vinyl monomer with retention of its vinylic group and with the formation of a covalent bond.

Within the context of the present invention, any reference hereinbefore or hereinafter to a copolymer is always intended to mean a copolymer wherein the monomers are present in the form of statistically distributed building blocks.

A copolymer wherein the monomers are present in the form of statistically distributed building blocks is to be understood as being a copolymer comprising at least two different types of monomer in the case of which, in 98% of all cases, the block size of identical monomer building blocks is in the range of from 1 to 10, preferably in 90% of all cases in the range of from 1 to 7 and more preferably in 80% of all cases in the range of from 1 to 5. Within the context of the present invention, the expression "statistical monomer distribution in a copolymer" or the expression "statistical copolymer" is also used to have the same meaning. A statistical monomer distribution in a copolymer also means that said copolymer is substantially free of homopolymers and block polymers. Statistical copolymers differ in their physical properties from their isomeric homopolymers and block polymers and can, if necessary, accordingly be separated therefrom by physical methods. Statistical copolymers are given their typical characterising features, for example, by their molecular weights, their solubilities, their thermal properties or their NMR spectra Statistical copolymers can be distinguished from non-statistical copolymers, for example, on the basis of the molecular weight distribution. Statistical copolymers generally exhibit a typical Gaussian molecular weight distribution while non-statistical copolymers do not. The molecular weight range of a statistical copolymer is generally adjustable and depends, inter alia, on the nature and amount of the solvent used. The average molecular weight can be adjusted, for example, to a range of from $1 \cdot 10^5$ to $4 \cdot 10^5$, for example when copolymerisation is carried out in methanol.

In the present invention, preference is given to copolymers according to claim 1 that comprise a copolymerisation product of a monomer mixture consisting of 30–95 mol % of a vinyl lactam (a) and 5–70 mol % of at least one vinyl monomer (b) and, where appropriate, a reactive vinyl monomer (c).

A preferred copolymer is a copolymer according to claim 1 that comprises a copolymerisation product of a monomer mixture consisting of 50–90 mol % of a vinyl lactam (a) and 10–50 mol % of at least one vinyl monomer (b) and, where appropriate, a reactive vinyl monomer (c).

More strongly preferred is a copolymer according to claim 1 that comprises a copolymerisation product of a monomer mixture consisting of 60–80 mol % of a vinyl lactam (a) and 20–40 mol % of at least one vinyl monomer (b) and, where appropriate, a reactive vinyl monomer (c).

The present invention relates preferably also to a copolymer according to claim 2 wherein the proportion of reactive vinyl monomer (c) is up to 50 mol % of the total amount of vinyl monomer (b) and (c).

Also preferred is a copolymer according to claim 3 wherein the proportion of reactive vinyl monomer (c) is from 5 to 40 mol % of the total amount of vinyl monomer (b) and (c).

Preference is given also to a copolymer according to claim 4 wherein the proportion of reactive vinyl monomer (c) is from 10 to 25 mol % of the total amount of vinyl monomer (b) and (c).

In the case of commercial lenses, the hydrophobic vinyl monomer used is principally methyl methacrylate (MMA). MMA can also be used in the present invention. In general, however, it is possible to use any vinyl monomer that, as a copolymer with a vinyl lactam, yields an optically clear and mechanically stable hydrogel.

A vinyl lactam (a) according to the invention is understood as being, for example, a five-to seven-membered lactam of formula I

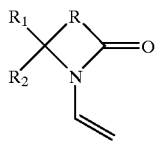

wherein
R is an alkylene bridge having from 2 to 8 carbon atoms,
$R_1$ is hydrogen, alkyl, aryl, aralkyl or alkaryl, preferably hydrogen or lower alkyl having up to 7 and, more preferably, up to 4 carbon atoms, such as, for example, methyl, ethyl or propyl; aryl having up to 10 carbon atoms, and also aralkyl or alkaryl having up to 14 carbon atoms; and
$R_2$ is hydrogen or lower alkyl having up to 7 and, more preferably, up to 4 carbon atoms, such as, for example, methyl, ethyl or propyl.

Some N-vinyl lactams (a) corresponding to the above structural formula I are N-vinyl-2-pyrrolidone, N-vinyl-2-piperidone, N-vinyl-2-caprolactam, N-vinyl-3-methyl-2-pyrrolidone, N-vinyl-3-methyl-2-piperidone, N-vinyl-3-methyl-2-caprolactam, N-vinyl-4-methyl-2-pyrrolidone, N-vinyl-4-methyl-2-caprolactam, N-vinyl-5-methyl-2-pyrrolidone, N-vinyl-5-methyl-2-piperidone, N-vinyl-5,5-dimethyl-2-pyrrolidone, N-vinyl-3,3,5-trimethyl-2-pyrrolidone, N-vinyl-5-methyl-5-ethyl-2-pyrrolidone, N-vinyl-3,4,5-trimethyl-3-ethyl-2-pyrrolidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl-7-methyl-2-caprolactam, N-vinyl-7-ethyl-2-caprolactam, N-vinyl-3,5-methyl-2-caprolactam, N-vinyl-4,6-dimethyl-2-caprolactam and N-vinyl-3,5,7-trimethyl-2-caprolactam. If desired, mixtures thereof may also be used.

A preferably used vinyl lactam (a) is a heterocyclic monomer of formula I containing from 4 to 6 carbon atoms in the heterocyclic ring.

A further preferably used vinyl lactam (a) is a heterocyclic monomer of formula I containing 4 carbon atoms in the heterocyclic ring.

A vinyl lactam (a) whose use is more strongly preferred is a heterocyclic monomer of formula I containing 4 carbon atoms in the heterocyclic ring and wherein $R_1$ is hydrogen or lower alkyl.

A vinyl lactam (a) whose use is likewise more strongly preferred is a heterocyclic monomer of formula I containing 4 carbon atoms in the heterocyclic ring and wherein $R_1$ and $R_2$ are each independently of the other hydrogen or lower alkyl.

A strongly preferred vinyl lactam (a) is N-vinyl-2-pyrrolidone.

A vinyl monomer (b) present in a copolymer according to the invention may be hydrophilic, hydrophobic, functional or a mixture of the three. Suitable vinylic monomers include especially those customarily used in the manufacture of contact lenses.

Hydrophobic vinylic monomers (b) are understood as being monomers that typically yield as homopolymers polymers that are water-insoluble and can absorb less than 10% by weight water.

Analogously, a hydrophilic vinylic monomer (b) is understood as being a monomer that typically yields as homopolymer a polymer that is water-soluble or can absorb at least 10% by weight water.

Suitable hydrophobic vinylic monomers (b) include, without this list being definitive, $C_1$–$C_{18}$alkyl and $C_3$–$C_{18}$cycloalkyl acrylates and methacrylates, $C_3$–$C_{18}$alkyl-acrylamides and -methacrylamides, acrylonitrile, methacrylonitrile, vinyl-$C_1$–$C_{18}$alkanoates, $C_2$–$C_{18}$-alkenes, $C_2$–$C_{18}$haloalkenes, styrene, lower alkylstyrene, lower alkyl vinyl ethers, $C_2$–$C_{10}$-perfluoroalkyl acrylates and methacrylates, or acrylates and methacrylates partially fluorinated in a corresponding manner, $C_3$–$C_{12}$perfluoroalkyl-ethyl-thiocarbonylaminoethyl acrylates and methacrylates, acryloxy- and methacryloxy-alkylsiloxanes, N-vinylcarbazole, $C_1$–$C_{12}$alkyl esters of maleic acid, fumaric acid, itaconic acid, mesaconic acid and the like. Preferred are, for example, $C_1$–$C_4$alkyl esters of vinylically unsaturated carboxylic acids having from 3 to 5 carbon atoms or vinyl esters of carboxylic acids having up to 5 carbon atoms.

Examples of suitable hydrophobic vinylic monomers include methyl acrylate, ethyl acrylate, propyl acrylate, isopropyl acrylate, cyclohexyl acrylate, 2-ethylhexyl acrylate, methyl methacrylate, ethyl methacrylate, propyl methacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyltoluene, vinyl ethyl ether, perfluorohexylethylthiocarbonylaminoethyl methacrylate, isobornyl methacrylate, trifluoroethyl methacrylate, hexafluoroisopropyl methacrylate, hexafluorobutyl methacrylate, tris-trimethylsilyloxy-silyl-propyl methacrylate, 3-methacryloxypropylpentamethyldisiloxane and bis (methacryloxypropyl)tetramethyldisiloxane.

Preferred examples of hydrophobic vinylic monomers (b) are methyl methacrylate and ethyl methacrylate.

Suitable hydrophilic vinylic monomers (b) include, without this list being definitive, hydroxy-substituted lower alkyl acrylates and methacrylates, acrylamide, methacrylamide, lower alkyl-acrylamides and -methacrylamides, ethoxylated acrylates and methacrylates, hydroxy-substituted lower alkyl-acrylamides and -methacrylamides, hydroxy-substituted lower alkyl vinyl ethers, sodium ethylenesulfonate, sodium styrenesulfonate, 2-acrylamido-2-methylpropanesulfonic acid, N-vinylpyrrole, 2- and 4-vinylpyridine, vinylically unsaturated carboxylic acids having a total of from 3 to 5 carbon atoms, amino-lower alkyl (the term "amino" also including quaternary ammonium), mono-lower alkylamino-lower alkyl and di-lower alkylamino-lower alkyl acrylates and methacrylates, allyl alcohol and the like. Preferred are, for example, hydroxy-substituted lower alkyl acrylates and methacrylates, hydroxy-substituted lower alkyl-acrylamides and -methacrylamides and vinylically unsaturated carboxylic acids having a total of from 3 to 5 carbon atoms.

Examples of suitable hydrophilic vinylic monomers (b) include hydroxyethyl methacrylate, hydroxyethyl acrylate, hydroxypropyl acrylate, ammonium ethyl methacrylate hydrochloride, acrylamide, methacrylamide, dimethylacrylamide, allyl alcohol, vinylpyridine, glycerol methacrylate, N-(1,1-dimethyl-3-oxobutyl)acrylamide, acrylic acid, methacrylic acid and the like.

Preferred hydrophilic vinylic monomers (b) are 2-hydroxyethyl methacrylate, acrylic acid, methacrylic acid and ammonium ethyl methacrylate hydrochloride.

A functional vinyl monomer (b) is a monomer that carries in addition to the vinyl group a functional group, such as, for example, hydroxy, amino, lower alkyl-substituted amino, carboxyl, esterified carboxyl, preferably lower alkoxycarbonyl, epoxy or sulfo (—SO$_3$H). The functional group is retained after copolymerisation and can be used for after-treatment or preferably for a modification of the copolymer.

Suitable functional vinyl monomers (b) that can be used are, for example, without this list being definitive, hydroxy-substituted lower alkyl acrylates and methacrylates, ethoxylated acrylates and methacrylates, epoxy-lower alkyl acrylates and methacrylates, epoxycycloalkyl-lower alkyl acrylates and methacrylates, hydroxy-substituted lower alkyl-acrylamides and -methacrylamides, hydroxy-substituted lower alkyl vinyl ethers, amino- or hydroxy-substituted styrenes, sodium ethylenesulfonate, sodium styrenesulfonate, 2-acrylamido-2-methylpropanesulfonic acid, acrylic acid, methacrylic acid, amino-lower alkyl (the term "amino" also including quaternary ammonium) and mono-lower alkylamino-lower alkyl acrylates and methacrylates, acryloxy- and methacryloxy-lower alkylmaleimides and allyl alcohol.

Examples of functional vinyl monomers are 2-hydroxyethyl methacrylate, 3-hydroxypropyl methacrylate, acrylic acid, methacrylic acid, 4-aminostyrene, 3-methacryloxymethyl-7-oxa-bicyclo [4.1.0]heptane (CHOMA), N-methacryloxyethyl-maleimide (DMI-O-MA), glycidyl methacrylate (GMA), ammonium ethyl methacrylate hydrochloride (AEMA) or ammonium propyl methacrylate hydrochloride (APMA).

Preferred functional vinyl monomers (b) are 2-hydroxyethyl methacrylate and ammonium ethyl methacrylate hydrochloride (AEMA).

A reactive vinyl monomer (c) is understood as being a monomer that carries a reactive group in addition to the vinyl group. A reactive vinyl monomer (c) is used for the modification of a copolymer after polymerisation, the reactive group of a monomer (c) reacting with a functional group present in the copolymer to form a covalent bond and the vinylic group of the monomer (c) being retained. A condition for the modification of a copolymer according to the invention is that a functional monomer (b) should be present as a building block in the mentioned copolymer.

Suitable as reactive vinyl monomer (c) are, for example, hydroxy-substituted lower alkyl acrylates and methacrylates, hydroxy-substituted lower alkyl-acrylamides and -methacrylamides, hydroxy-substituted lower alkyl vinyl ethers, 2-acrylamido-2-methylpropanesulfonic acid, amino-lower alkyl (the term "amino" also including quaternary ammonium) and mono-lower alkylamino-lower alkyl acrylates and methacrylates, allyl alcohol, epoxy-lower alkyl acrylates and methacrylates, isocyanato-lower alkyl acrylates and methacrylates, vinylically unsaturated carboxylic acids having from 3 to 7 carbon atoms and also the acid chlorides and anhyrides thereof, amino-, hydroxy- or isocyanate-substituted styrenes and epoxycycloalkyl-lower alkyl acrylates and methacrylates.

Examples of suitable reactive vinyl monomers (c) include, inter alia, hydroxyethyl acrylate and methacrylate, hydroxypropyl acrylate and methacrylate, allyl alcohol, glycerol methacrylate, acrylic acid, acrylic acid chloride, methacrylic acid, methacrylic acid chloride, 4-aminostyrene, 3-methacryloxymethyl-7-oxa-bicyclo [4.1.0]heptane (CHOMA), isocyanatoethyl acrylate and methacrylate, glycidyl methacrylate (GMA), ammonium ethyl methacrylate hydrochloride (AEMA) and ammonium propyl methacrylate hydrochloride (APMA).

Preferred reactive vinyl monomers (c) are hydroxyethyl acrylate and methacrylate, hydroxypropyl acrylate and methacrylate, isocyanatoethyl acrylate and methacrylate, acrylic and methacrylic acid chloride, ammonium ethyl methacrylate hydrochloride (AEMA) and ammonium propyl methacrylate hydrochloride (APMA).

Within the context of this invention, the term "lower" used in connection with radicals and compounds means, unless defined otherwise, especially radicals or compounds having up to 7 carbon atoms, preferably having up to 4 carbon atoms.

Lower alkyl has especially up to 7 carbon atoms, preferably up to 4 carbon atoms, and is, for example, methyl, ethyl, propyl, butyl or tert-butyl.

Aryl is, for example, naphthyl, pyridyl, thienyl or preferably phenyl that is unsubstituted or substituted by lower alkyl or by lower alkoxy.

Lower alkoxy has especially up to 7 carbon atoms, preferably up to 4 carbon atoms, and is, for example, methoxy, ethoxy, propoxy or tert-butoxy.

Aralkyl is preferably phenyl-lower alkyl having up to 4 carbon atoms in the alkyl unit, for example 1- or 2-phenylethyl or benzyl.

Alkaryl is preferably lower alkylphenyl having up to 4 carbon atoms in the alkyl unit, for example ethylphenyl or tolyl.

Cycloalkyl has especially up to 7 carbon atoms, preferably from 3 to 6 carbon atoms, and is, for example, cyclopropyl, cyclobutyl, cyclopentyl or cyclohexyl.

The present invention relates also to statistical copolymers wherein the monomer building blocks are selected from vinyl lactam (a) that is a heterocyclic monomer of formula I having 4 carbon atoms in the heterocyclic ring, and from vinyl monomer (b) that is unsubstituted or hydroxy-substituted $C_1$–$C_{18}$alkyl acrylate or methacrylate, lower alkylacrylamide or -methacrylamide or allyl alcohol.

Other monomer building blocks preferably used in a copolymer according to the invention are, for example, a vinyl lactam (a) that is a heterocyclic monomer of formula I containing 4 carbon atoms in the heterocyclic ring, and a vinyl monomer (c) selected from amino-lower alkyl and mono-lower alkyl-amino-lower alkyl acrylates and methacrylates, epoxy-lower alkyl acrylate and methacrylate and a vinylically unsaturated carboxylic acid having from 3 to 7 carbon atoms and also the acid chlorides and anhydrides thereof.

Further monomer building blocks preferably used in a copolymer according to the invention are, for example, a vinyl lactam (a) that is a heterocyclic monomer of formula I containing 4 carbon atoms in the heterocyclic ring, a vinyl monomer (b) selected from unsubstituted and hydroxy-substituted $C_1$–$C_{18}$alkyl acrylate and methacrylate, amino-lower alkyl and mono-lower alkylamino-lower alkyl acrylate and methacrylate, and a vinyl monomer (c) selected from epoxy-lower alkyl acrylate and methacrylate, isocyanato-lower alkyl acrylate and methacrylate and a vinylically unsaturated carboxylic acid having from 3 to 7 carbon atoms and also the acid chloride and anhydride thereof.

Other monomer building blocks preferably used in a copolymer according to the invention are, for example, vinylpyrrolidone, a vinyl monomer (b) selected from hydroxy-substituted $C_1$–$C_{18}$alkyl acrylate and methacrylate, and a vinyl monomer (c) selected from amino-lower alkyl and mono-lower alkyl-amino-lower alkyl acrylate and methacrylate, epoxy-lower alkyl acrylate and methacrylate and a vinylically unsaturated carboxylic acid having from 3 to 7 carbon atoms and also the acid chloride and anhydride thereof.

Other monomer building blocks preferably used in a copolymer according to the invention are, for example, vinylpyrrolidone, a monomer (b) selected from hydroxy-ethyl methacrylate and hydroxypropyl methacrylate, and a vinyl monomer (c) selected from amino-lower alkyl and mono-lower alkylamino-lower alkyl acrylate and methacrylate and epoxy-lower alkyl acrylate and methacrylate.

Other monomer building blocks preferably used in a copolymer according to the invention are, for example, vinylpyrrolidone, a monomer (b) selected from methyl methacrylate, hydroxyethyl methacrylate and hydroxypropyl methacrylate, and a vinyl monomer (c) selected from glycidyl methacrylate (GMA), isocyanatoethyl methacrylate, ammonium ethyl methacrylate hydrochloride (AEMA) and ammonium propyl methacrylate hydrochloride (APMA).

Other monomer building blocks preferably used in a copolymer according to the invention are, for example, vinylpyrrolidone, a monomer (b) selected from methyl methacrylate, N,N-dimethylmethacrylamide, ammonium ethyl methacrylate hydrochloride (AEMA), ammonium propyl methacrylate hydrochloride (APMA), hydroxyethyl methacrylate and hydroxypropyl methacrylate, and a vinyl monomer (c) selected from glycidyl methacrylate (GMA), isocyanatoethyl methacrylate (IEM) and methacrylic acid.

The present invention relates also to a process for the preparation of a statistical copolymer.

In order to synthesise a copolymer with a statistical distribution of the monomer building blocks, it is necessary to take into account the copolymerisation parameters of the monomers used. The present invention is concerned with a process for the synthesis of statistical copolymers taking into account the Lewis-Mayo theory.

The copolymer composition can be calculated from the copolymerisation parameters and from the monomer composition, or the necessary monomer composition can be calculated from the desired copolymer composition and the copolymerisation parameters, in accordance with the Lewis-Mayo equation.

The Lewis-Mayo equation is as follows:

$F_1/F_2 = ((r_1 \cdot M_1) + M_2)/((r_2 \cdot M_2) + M_1)$, wherein the following meanings apply:

$F_1/F_2$=ratio of the monomer building blocks in the copolymer, $M_1$; $M_2$=instantaneous monomer concentrations in the reaction vessel, $r_1 = k_{11}/k_{12}$; $r_2 = k_{22}/k_{21}$ copolymerisation parameters which can be taken from books of tables, $k_{ij}$ wherein i=1,2 and j=1,2 speed constants of the reactions of radical i with monomer j.

A process for the preparation of a statistical copolymer is characterised by the following description. A monomer mixture I, the composition of which gives the desired copolymer composition in accordance with the Lewis-Mayo equation, is placed in a reaction vessel and polymerisation is initiated, for example with a thermal initiator (for example AIBN). After polymerisation has been initiated, a monomer mixture II is metered in, the composition of which corresponds to the desired copolymer composition. The metering speed is in accordance with the consumption of the monomers. The following conditions must be observed in the reaction vessel:

$dM_1/dt = dM_2/dt = 0$ and $dM_1/dM_2 = const.$; this means that the concentration of the monomers must remain the same during the reaction and their ratio is to be constant. Those conditions can be met in two ways:

1. Since the initiator concentration decreases in accordance with first-order kinetics and, accordingly, the polymerisation speed is also not constant over time, that has to be taken into account in the metering speed. The metering speed of the monomer mixture II can be reduced approximately in a linear manner.

2. By metering in an initiator during the reaction, the initiator concentration and accordingly also the polymerisation speed can be kept constant. Thus, the metering in of the monomer mixture II can also be effected in a manner that is constant over time.

Since monomers are introduced continuously into the reaction vessel in the case of this copolymer synthesis but no product is discharged (semi-batch operation), the reaction has to be stopped.

In case 1, that occurs automatically since the initiator concentration falls to zero. In case 2, the metering in of the monomers, or of the initiator, has to be stopped. When metering is complete, the monomers still remaining react to completion to form non-statistical copolymers. That quantity of residual monomers is determined by the batch size at time t=0, which is why the latter should be as small as possible.

In the case of terpolymerisation, approximately the same process can be applied. Especially advantageous conditions for the purpose prevail when the third monomer (b), for example HEMA, GMA, CHOMA, etc., is related chemically to the second monomer, for example MMA (b), and, during copolymerisation, behaves similarly to the vinyl lactam (a) used, for example N-vinylpyrrolidone, that is to say, exhibits a similar copolymerisation parameter.

As mentioned, the composition of the monomer components in a monomer mixture II corresponds to the desired final composition of a copolymer. The composition of the monomer mixture I can be calculated therefrom using the Lewis-Mayo relationship.

The preparation of a copolymer according to the invention can be carried out in the presence or absence of a solvent. A suitable solvent is in principle any solvent that dissolves both an uncross-linked copolymer and one of the vinyl monomers (a), (b) and (c) used and is substantially inert towards them. Examples are water, alcohols, such as lower alkanols, for example ethanol or methanol, and also carboxylic acid am ides, such as dimethylformamide or dimethyl sulfoxide, ethers, such as, for example, diethyl ether, THF or diglymes, also mixtures of suitable solvents, such as, for example, mixtures of an alcohol and an ether, such as, for example, ethanol/THF, or methanol/diethyl ether. It is preferable to use lower alkanols, for example ethanol or methanol.

The composition of a copolymer according to the invention, after it has been cross-linked, decides the characteristics of a resulting moulding, such as, for example, a hydrogel contact lens. The ratio of hydrophilic to hydrophobic building blocks (a), (b) and (c) in a copolymer can be used especially to control the mechanical properties of a contact lens. The water content, for example of a hydrogel contact lens, is determined, for example, by the content of vinyl lactam, for example N-vinyl-2-pyrrolidone, in the copolymer. Hydrophilic vinyl monomers, such as, for example, HEMA or methacrylic acid, can also be used to control the water content in a hydrogel.

A possible method of controlling the molecular weight of a copolymer is to use a regulator during synthesis. A preferred regulator is a lower alkanol, such as, for example, methanol or ethanol, which can be used simultaneously, for example, as solvent in the synthesis.

When it has been produced, a copolymer according to the invention can be purified using customary methods, for example by dissolving and reprecipitating, filtering, removing residual monomers in vacuo, optionally at elevated temperature. Any solvent used can be removed using a rotary evaporator or by casting and drying a film in air or in vacuo. An especially elegant method is purification by ultrafiltration for the removal of low-molecular-weight portions and thus also simple adjustment of the desired concentration of the aqueous copolymer solution.

The present invention relates also to the preparation of hydrogel contact lenses having final geometry and final water content that are obtainable from aqueous solution within seconds, comprising the steps of dissolving a statistical copolymer in water and then cross-linking in a suitable manner, for example in a mould. The obvious advantages are:

residual monomers can be removed at the stage of the uncross-linked copolymer;

the conversion during cross-linking is substantially lower because the network is made up of polymers and not of monomers;

the reaction times are very short, generally not longer than 1 minute and typically shorter than 20 seconds; and a time-intensive extraction of the contact lens with water is no longer imperative because the cross-linking can be effected in water.

Therefore, an aqueous solution is advantageously prepared for the cross-linking of a copolymer according to the invention. If a solvent was used in the synthesis of a copolymer, that solvent can be removed completely first of all or only after the addition of a corresponding amount of water. The concentration of a copolymer solution is preferably so adjusted that the water content of the solution is as near as possible to that of a finished contact lens. In a preferred method of preparation, the water content of an aqueous copolymer solution corresponds to the final water content of a cross-linked copolymer, that is to say, of a hydrogel.

The cross-linking of a copolymer to form the hydrogel is effected as an independent step and can be carried out in various manners.

A first method consists in exposing a copolymer according to the invention in suitable form to high-energy radiation, for example electron and gamma rays, and also actinic or UV-radiation, which produce radicals in the copolymer. Those radicals can react to completion to form cross-linked copolymers. With that method of cross-linking, no special demands are made in respect of the nature of an uncross-linked copolymer according to the invention.

Another possible method consists in using different reaction mechanisms for the cross-linking on the one hand and for the synthesis of a statistical copolymer on the other. For example, a copolymer may be built up by means of radical polymerisation with thermal initiation, there also being incorporated in the copolymer, for example by a [2+2] cyclo-addition, a monomer building block that can cross-link only when subjected to UV-radiation. That can be effected, for example, by an N-methacrylic-substituted maleimide, the methacrylic group of which has been copolymerised with, for example, vinylpyrrolidone and another vinyl monomer of a different type.

A further possible method consists in first modifying a copolymer that comprises a functional vinyl monomer (b) as building block with a reactive monomer (c). According to the definition, the vinylic group of the reactive monomer (c) is retained after such a modification. A copolymer so modified can then be cross-linked, for example, with UV light of a suitable wavelength, for example in the presence of a photoinitiator.

A preferred possible method of cross-linking is the photocross-linking of copolymers disclosed according to claim 1; especially preferred is the photocross-linking of copolymers disclosed according to claim 1 that have been modified with a reactive monomer (c).

In the case of photocross-linking, it is suitable to add a photoinitiator that can initiate radical cross-linking. Examples of such photoinitiators are familiar to the person skilled in the art; there may be mentioned specifically as suitable photoinitiators benzoin methyl ether, 1-hydroxycyclohexyl phenyl ketone, Darocur and Irgacure types, preferably Darocur 1173® and Irgacure 2959®. Cross-linking can then be triggered by actinic radiation, such as, for example, UV light of a suitable wavelength.

Also suitable are photoinitiators that are incorporated in the copolymer before the cross-linking step. Examples of especially suitable photoinitiators are derivatives of Irgacure 2959® that have been modified, for example, with methacrylic acid. A methacrylic acid esterified with, for example, Irgacure 2959® can be incorporated as a special monomer into a copolymer. Such a copolymer is then suitable for being cross-linked directly, without the addition of a photoinitiator.

Cross-linking is suitably carried out in a solvent. Suitable solvents are in principle any solvents that dissolve copolymers, for example water, alcohols, such as lower alkanols, for example ethanol or methanol, and also carboxylic acid amides, such as dimethyl-formamide or dimethyl sulfoxide, also mixtures of suitable solvents, such as, for example, mixtures of water and an alcohol, such as, for example, a water/ethanol mixture or a water/methanol mixture.

The cross-linking is preferably carried out directly from an aqueous solution of a copolymer according to the invention. Such an aqueous solution can also be obtained directly as the result of a preferred purification step, for example ultrafiltration. For example, a cross-linking, preferably a photocross-linking, of an approximately 10 to 40% aqueous solution can be carried out.

The present invention relates also to a hydrogel that consists substantially of a copolymer in cross-linked form disclosed according to claim 1.

The present invention relates preferably to a hydrogel consisting substantially of a copolymer in cross-linked form disclosed according to claim 1, the hydrogel being a contact lens.

The present invention relates preferably also to a contact lens consisting substantially of a copolymer in the cross-linked state disclosed according to claim 1.

The present invention relates also to a contact lens obtainable by cross-linking a copolymer disclosed according to claim 1.

The following Examples serve to illustrate the present invention further, they are not, however, intended to limit the scope thereof in any way. Temperatures are given in degrees Celsius.

The abbreviations "poly" and "stat" used in connection with the following Examples denote statistical (stat) copolymers (poly).

EXAMPLE 1

Synthesis of poly(N-vinylpyrrolidone-stat-methyl methacrylate)

15.26 g (0.14 mol) of N-vinylpyrrolidone, 0.25 g (2.5 mmol) of methyl methacrylate and 60.55 g of methanol are introduced into a 500 ml brown glass three-necked flask having a stirrer, a Claisen attachment and a reflux condenser. The charged apparatus is scavenged with nitrogen via the reflux condenser, the batch is heated under nitrogen to boiling point and a solution of 31.8 mg (0.194 mmol) of AIBN and 1.5 g of methanol is added to the batch via a septum using a syringe. Using two Mikrolab M metering units manufactured by Hamilton, a solution A consisting of 40.0 g (0.36 mol) of N-vinylpyrrolidone, 18.02 g (0.18 mol) of methyl methacrylate and 232.06 g of methanol is metered in at a rate of 100 $\mu$l per minute and a solution B consisting of 79.5 mg (0.484 mmol) of AIBN and 8.95 ml of methanol is metered in at a rate of 9 $\mu$l per 99 seconds. After 24 hours, metering is stopped, the batch is allowed to react for a further 16 hours under reflux, is cooled to room temperature and the polymer solution is cast to form a film which is then freed of residual monomers and solvent at 60° C. and 10 Pa (0.1 mbar) in a vacuum drying chamber.

Yield: approx. 80–85% of the monomers used.

The polymer dissolves at room temperature in $H_2O$, $CH_3OH$ and $C_2H_5OH$ (in each case to the extent of 20% by weight).

EXAMPLE 2

Synthesis of poly(N-vinylpyrrolidone-stat-methyl methacrylate-stat-glycidyl methacrylate)terpolymers 15.26 g (0.14 mol) of N-vinylpyrrolidone, 0.25 g (2.5 mmol) of methyl methacrylate and 60.55 g of methanol are introduced into a 500 ml brown glass three-necked flask having a stirrer, a Claisen attachment and a reflux condenser. The charged apparatus is scavenged with nitrogen via the reflux condenser, the batch is heated under nitrogen to boiling point and a solution of 31.8 mg (0.194 mmol) of AIBN and 1.5 g of methanol is added to the batch via a septum using a syringe. Using two Mikrolab M metering units manufactured by Hamilton, a solution A consisting of 40.0 g (0.36 mol) of N-vinylpyrrolidone, 9.01 g (89.98 mmol) of methyl methacrylate, 12.8 g (89.98 mmol) of glycidyl methacrylate and 232.06 g of methanol is metered in at a rate of 200 $\mu$l per minute and a solution B consisting of 79.5 mg (0.484 mmol) of AIBN and 8.95 ml of methanol is metered in at a rate of 9 $\mu$l per 99 seconds. After 24 hours, metering is stopped, the batch is allowed to react for a further 16 hours under reflux, is cooled to room temperature and the polymer solution is cast to form a film. The film is then freed of residual monomers and solvent at 60° C. and 10 Pa (0.1 mbar) in a vacuum drying chamber.

Yield: approx. 80–85% of the monomers used.

The polymers dissolve at room temperature in $H_2O$, $CH_3OH$ and $C_2H_5OH$ (in each case to the extent of 20% by weight).

EXAMPLE 3

Synthesis of poly(N-vinylpyrrolidone-stat-methyl methacrylate-stat-hydroxyethyl methacrylate) terpolymers 15.26 g (0.14 mol) of N-vinylpyrrolidone, 0.25 g (2.5 mmol) of methyl methacrylate and 60.55 g of methanol are introduced into a 500 ml brown glass three-necked flask having a stirrer, a Claisen attachment and a reflux condenser. The charged apparatus is scavenged with nitrogen via the reflux condenser, the batch is heated under nitrogen to boiling point and a solution of 31.8 mg (0.194 mmol) of AIBN and 1.5 g of methanol is added to the batch via a septum using a syringe. Using two Mikrolab M metering units manufactured by Hamilton, a solution A consisting of 40.0 g (0.36 mol) of N-vinylpyrrolidone, 9.01 g (89.98 mmol) of methyl methacrylate, 11.71 g (89.98 mmol) of hydroxyethyl methacrylate and 232.06 g of methanol is metered in at a rate of 200 $\mu$l per minute and a solution B consisting of 79.5 mg (0.484 mmol) of AIBN and 8.95 ml of methanol is metered in at a rate of 9 $\mu$l per 99 seconds. After 24 hours, metering is stopped, the batch is allowed to react for a further 16 hours under reflux, is cooled to room temperature and the polymer solution is cast to form a film. The film is then freed of residual monomers and solvent at 60° C. and 10 Pa (0.1 mbar) in a vacuum drying chamber.

Yield: approx. 80–85% of the monomers used.

The polymers dissolve at room temperature in $H_2O$, $CH_3OH$ and $C_2H_5OH$ (in each case to the extent of 20% by weight).

EXAMPLE 4

Synthesis of poly(N-vinylpyrrolidone-stat-methyl methacrylate-stat-cyclohexene oxide methacrylate) terpolymers 15.26 g (0.14 mol) of N-vinylpyrrolidone, 0.25 g (2.5 mmol) of methyl methacrylate and 60.55 g of methanol are introduced into a 500 ml brown glass three-necked flask having a stirrer, a Claisen attachment and a reflux condenser. The charged apparatus is scavenged with nitrogen via the reflux condenser, the batch is heated under nitrogen to boiling point and a solution of 31.8 mg (0.194 mmol) of AIBN and 1.5 g of methanol is added to the batch via a septum using a syringe. Using two Mikrolab M metering units manufactured by Hamilton, a solution A consisting of 40.0 g (0.36 mol) of N-vinylpyrrolidone, 9.01 g (89.98 mmol) of methyl methacrylate, 16.4 g (89.98 mmol) of cyclohexene oxide methacrylate and 232.06 g of methanol is metered in at a rate of 200 $\mu$l per minute and a solution B consisting of 79.5 mg (0.484 mmol) of AIBN and 8.95 ml of methanol is metered in at a rate of 9 $\mu$l per 99 seconds. After 24 hours, metering is stopped, the batch is allowed to react for a further 16 hours under reflux, is cooled to room temperature and the polymer solution is cast to form a film. The film is then freed of residual monomers and solvent at 60° C. and 10 Pa (0.1 mbar) in a vacuum drying chamber.

Yield: approx. 80–85% of the monomers used.

The polymers dissolve at room temperature in $H_2O$, $CH_3OH$ and $C_2H_5OH$ (in each case to the extent of 20% by weight).

EXAMPLE 5

Synthesis of poly(N-vinylpyrrolidone-stat-methyl methacrylate-stat-DMI-O-MA)terpolymers 15.26 g (0.14 mol) of N-vinylpyrrolidone, 0.25 g (2.5 mmol) of methyl methacrylate and 60.55 g of methanol are introduced into a 500 ml brown glass three-necked flask having a stirrer, a Claisen attachment and a reflux condenser. The charged apparatus is scavenged with nitrogen via the reflux condenser, the batch is heated under nitrogen to boiling point and a solution of 31.8 mg (0.194 mmol) of AIBN and 1.5 g of methanol is added to the batch via a septum using a syringe. Using a Mikrolab M metering unit manufactured by Hamilton, a solution consisting of 40.0 g (0.36 mol) of N-vinylpyrrolidone, 9.01 g (89.98 mmol) of methyl methacrylate, 25.3 g (89.98 mmol) of DMI-O-MA and 232.06 g of methanol is metered in at a rate that decreases in a linear manner (initial rate of 100 μl per minute decreasing to 3 μl per minute). After 24 hours, metering is stopped, the batch is allowed to react for a further 16 hours under reflux, is cooled to room temperature and the polymer solution is cast to form a film. The film is then freed of residual monomers and solvent at 60° C. and 10 Pa (0.1 mbar) in a vacuum drying chamber.

Yield: approx. 80–85% of the monomers used.

The polymer dissolves at room temperature in $H_2O$, $CH_3OH$ and $C_2H_5OH$ (in each case to the extent of 20% by weight).

EXAMPLE 6

Synthesis of poly(N-vinylpyrrolidone-stat-methyl methacrylate-stat-2-hydroxyethyl methacrylate) terpolymers 15.26 g (0.14 mol) of N-vinylpyrrolidone, 0.25 g (2.5 mmol) of methyl methacrylate and 60.55 g of methanol are introduced into a 500 ml brown glass three-necked flask having a stirrer, a Claisen attachment and a reflux condenser. The charged apparatus is scavenged with nitrogen via the reflux condenser, the batch is heated under nitrogen to boiling point and a solution of 31.8 mg (0.194 mmol) of AIBN and 1.5 g of methanol is added to the batch via a septum using a syringe. Using a Mikrolab M metering unit manufactured by Hamilton, a solution consisting of 40.0 g (0.36 mol) of N-vinylpyrrolidone, 9.01 g (89.98 mmol) of methyl methacrylate, 11.71 g (89.98 mmol) of 2-hydroxyethyl methacrylate and 232.06 g of methanol is metered in at a rate that decreases in a linear manner (initial rate of 200 μl per minute decreasing to 6 μl per minute). After 24 hours, metering is stopped, the batch is allowed to react for a further 16 hours under reflux, is cooled to room temperature and the polymer solution is cast to form a film. The film is then freed of residual monomers and solvent at 60° C. and 10 Pa (0.1 mbar) in a vacuum drying chamber.

Yield: approx. 80–85% of the monomers used.

OH group content: approx. 1.00 (mmol OH)/g

The polymer dissolves at room temperature in $H_2O$, $CH_3OH$ and $C_2H_5OH$ (in each case to the extent of 20% by weight).

EXAMPLE 7

Synthesis of poly(N-vinylpyrrolidone-stat-methyl methacrylate-stat-2-hydroxyethyl methacrylate-stat-1,1-dimethyl-2-oxo-2-{4-[[[(3,5,5-trimethyl-3-methylaminomethyl-cyclohexyl)-amino]-carbonyl]-ethoxy]-phenoxy}-ethyl methacrylate)

3.92 g (35.3 mmol) of N-vinylpyrrolidone, 0.031 g (0.312 mmol) of methyl methacrylate, 0.045 g (0.35 mmol) of 2-hydroxyethyl methacrylate, 0.007 g (0.012 mmol) of 1,1-dimethyl-2-oxo-2-{4-[[[(3,5,5-trimethyl-3-methylaminomethyl-cyclohexyl)-amino]-carbonyl]-ethoxy]-phenoxy}-ethyl methacrylate and 15.97 g of methanol are introduced into a 250 ml brown glass three-necked flask having a stirrer, a Claisen attachment and a reflux condenser. The charged apparatus is scavenged with nitrogen via the reflux condenser, the batch is heated under nitrogen to boiling point and a solution of 8.0 mg (0.049 mmol) of AIBN and 0.38 g of methanol is added to the batch via a septum using a syringe. Using a Mikrolab M metering unit manufactured by Hamilton, a solution consisting of 5.0 g (44.99 mmol) of N-vinylpyrrolidone, 1.13 g (11.25 mmol) of methyl methacrylate, 1.46 g (11.24 mmol) of 2-hydroxyethyl methacrylate, 0.46 g (0.79 mmol) of 1,1-dimethyl-2-oxo-2-{4-[[[(3,5,5-trimethyl-3-methylaminomethyl-cyclohexyl)-amino]-carbonyl]-ethoxy]-phenoxy}-ethyl methacrylate and 32.18 g of methanol is metered in at a rate that decreases in a linear manner (initial rate of 100 μl per minute decreasing to 10 μl per minute). After 24 hours, metering is stopped, the batch is allowed to react for a further 16 hours under reflux and is cooled to room temperature. The solution is introduced into 450 ml of acetone, the polymer precipitating in the form of a sticky solid. The supernatant solution is decanted and the residue is dried in a vacuum drying chamber to give the compound named in the title.

EXAMPLE 8

Synthesis of poly(N-vinylpyrrolidone-stat-2-hydroxyethyl methacrylate-stat-glycidyl methacrylate)

15.26 g (0.14 mol) of N-vinylpyrrolidone, 0.33 g (2.5 mmol) of 2-hydroxyethyl methacrylate and 60.55 g of methanol are introduced into a 500 ml brown glass three-necked flask having a stirrer, a Claisen attachment and a reflux condenser. The charged apparatus is scavenged with nitrogen via the reflux condenser, the batch is heated under nitrogen to boiling point and a solution of 31.8 mg (0.194 mmol) of AIBN and 1.5 g of methanol is added to the batch via a septum using a syringe. Using two Mikrolab M metering units manufactured by Hamilton, a solution A consisting of 40.0 g (0.36 mol) of N-vinylpyrrolidone, 11.7 g (89.98 mmol) of 2-hydroxyethyl methacrylate, 12.8 g (89.98 mmol) of glycidyl methacrylate and 232.06 g of methanol is metered in at a rate of 200 μl per minute and a solution B consisting of 79.5 mg (0.48 mmol) of AIBN and 8.95 ml of methanol is metered in at a rate of 9 μl per 99 seconds. After 24 hours, metering is stopped, the batch is allowed to react for a further 16 hours under reflux, is cooled to room temperature and the polymer solution is cast to form a film. The film is then freed of residual monomers and solvent at 60° C. and 10 Pa (0.1 mbar) in a vacuum drying chamber.

Yield: approx. 80–85% of the monomers used.

The polymer dissolves at room temperature in $H_2O$, $CH_3OH$ and $C_2H_5OH$ (in each case to the extent of 20% by weight).

EXAMPLE 9

Synthesis of poly(N-vinylpyrrolidone-stat-2-hydroxyethyl methacrylate-stat-cyclohexene oxide acrylate)

15.26 g (0.14 mol) of N-vinylpyrrolidone, 0.33 g (2.5 mmol) of 2-hydroxyethyl methacrylate and 60.55 g of methanol are introduced into a 500 ml brown glass three-necked flask having a stirrer, a Claisen attachment and a reflux condenser. The charged apparatus is scavenged with nitrogen via the reflux condenser, the batch is heated under nitrogen to boiling point and a solution of 31.8 mg (0.194 mmol) of AIBN and 1.5 g of methanol is added to the batch via a septum using a syringe. Using two Mikrolab M metering units manufactured by Hamilton, a solution A consisting of 40.0 g (0.36 mol) of N-vinylpyrrolidone, 11.7 g (89.98 mmol) of 2-hydroxyethyl methacrylate, 16.4 g (89.98 mmol) of cyclohexene oxide acrylate and 232.06 g of methanol is metered in at a rate of 200 µl per minute and a solution B consisting of 79.5 mg (0.48 mmol) of AIBN and 8.95 ml of methanol is metered in at a rate of 9 µl per 99 seconds. After 24 hours, metering is stopped, the batch is allowed to react for a further 16 hours under reflux, is cooled to room temperature and the polymer solution is cast to form a film. The film is then freed of residual monomers and solvent at 60° C. and 10 Pa (0.1 mbar) in a vacuum drying chamber.

Yield: approx. 80–85% of the monomers used.

The polymer dissolves at room temperature in $H_2O$, $CH_3OH$ and $C_2H_5OH$ (in each case to the extent of 20% by weight).

EXAMPLE 10

Functionalisation of poly(N-vinylpyrrolidone-stat-glycidyl methacrylate) with methacrylic acid Two 3.0 g portions of the polymer of Example 3 (2.56 mmol of epoxy groups) are dissolved in 30 g of DMF (anhydrous) and each solution is stabilised with approximately 11 mg of hydroquinone. 442.9 mg (5.12 mmol) of methacrylic acid are then added to each solution (in each case twice the molar amount based on the epoxy group content, which is determined by titration of the polymer in glacial acetic acid in the presence of tetrabutyl-ammonium bromide with 0.1 molar perchloric acid) and heating is effected to 100° C. 3.33 g of $Al_2O_3$ are then added to one solution and 4.4 mg of $FeCl_3$ are added to the second solution, and a stream of dry air is passed over the reaction solutions. After a reaction time of from 6 to 10 hours, insoluble portions are filtered off while hot via a Büchner funnel, and the epoxy content of the solutions is again determined by titration. The volatile portions of the reaction solutions are distilled off under a high vacuum at 40° C. and the residues are dissolved in water. The aqueous solutions are freed of residual monomers by ultrafiltration and then concentrated to the desired solids contents.

Degree of reaction with $Al_2O_3$: approx. 33%

Degree of reaction with $FeCl_3$: 17–18%

The polymer dissolves at room temperature in $H_2O$, $CH_3OH$ and $C_2H_5OH$ (in each case to the extent of 20% by weight).

EXAMPLE 11

Functionalisation of poly(N-vinylpyrrolidone-stat-glycidyl methacrylate) with 2-hydroxyethyl methacrylate Two 3.0 g portions of the polymer of Example 3 (2.56 mmol of epoxy groups) are dissolved in 30 g of DMF (anhydrous) and each solution is stabilised with approximately 11 mg of hydroquinone. 668.2 mg (5.12 mmol) of 2-hydroxyethyl methacrylate are added to each solution (in each case twice the molar amount based on the epoxy group content, which is determined by titration of the polymer in glacial acetic acid in the presence of tetrabutylammonium bromide with 0.1 molar perchloric acid) and heating is effected to 100° C. 3.33 g of $Al_2O_3$ are then added to one solution and 7.3 mg of $FeCl_3$ are added to the second solution, and a stream of dry air is passed over the reaction solutions. After a reaction time of from 6 to 10 hours, insoluble portions are filtered off while hot via a Büchner funnel, and the epoxy content of the solutions is again determined by titration. The volatile portions of the reaction solutions are distilled off under a high vacuum at 40° C. and the residues are dissolved in water. The aqueous solutions are freed of residual monomers by ultrafiltration and then concentrated to the desired solids contents.

Degree of reaction with $Al_2O_3$: approx. 33%

Degree of reaction with $FeCl_3$: 17–18%

The polymer dissolves at room temperature in $H_2O$, $CH_3OH$ and $C_2H_5OH$ (in each case to the extent of 20% by weight).

EXAMPLE 12

Functionalisation of poly(N-vinylpyrrolidone-stat-methyl methacrylate-stat-2-hydroxyethyl methacrylate) with methacrylic acid chloride 2.18 g of the polymer of Example 6 named in the title (2.18 mmol of OH groups) are dissolved in 30.63 g of dimethylacetamide, and 5 mg of hydroquinone and 419 µl (4.29 mmol) of methacrylic acid chloride are added. The reaction mixture is heated for 4 hours at 80° C. and, after that period, the batch is allowed to cool and 100 ml of acetone are added thereto. The solution is introduced into 400 ml of acetone, the polymer precipitating in the form of a sticky solid. The supernatant solution is decanted and the residue is dried in a vacuum drying chamber.

Yield after precipitation: 1.39 g (53% of the theoretical yield)

The polymer is soluble in $H_2O$, $CH_3OH$ and $C_2H_5OH$ (in each case to the extent of 30% by weight).

EXAMPLE 13

Functionalisation of poly(N-vinylpyrrolidone-stat-methyl methacrylate-stat-2-hydroxyethyl methacrylate-stat-1,1-dimethyl-2-oxo-2-{4-[[[(3,5,5-trimethyl-3-methylaminomethyl-cyclohexyl)-amino]-carbonyl]-ethoxy]-phenoxy}-ethyl methacrylate) with methacrylic acid chloride 2.01 g of the polymer of Example 7 named in the title (2.98 mmol of OH groups) are dissolved in 30.13 g of dimethylacetamide, and 5 mg of hydroquinone and 583 µl (5.97 mmol) of methacrylic acid chloride are added. The reaction mixture is heated for 4 hours at 80° C. and, after that period, the batch is allowed to cool and 100 ml of acetone are added thereto. The solution is introduced into 400 ml of acetone, the polymer precipitating in the form of a sticky solid. The supernatant solution is decanted and the residue is dried in a vacuum drying chamber.

Yield after precipitation: 1.39 g (53% of the theoretical yield)

EXAMPLE 14

Cross-linking of the Polymer of Example 12

An 18% aqueous solution (a) and a 30% aqueous solution (b) are prepared from the functionalised polymer of Example 12, and 0.3% (based on the amount of polymer) of Darocur 2959® is added to each of the two solutions. The solutions are introduced into polypropylene (PP) moulds having lens geometry and the filled moulds are irradiated for 12 seconds with a 500 W Hg high pressure lamp for example Oriel type no. 6285). The cross-linked copolymers are then caused to swell in physiological saline solution, there being formed from a) 18% by weight of colloidal solution (sol, uncross-linked) a hydrogel with 90% by weight of water, and from
b) 30% by weight of colloidal solution (sol, uncross-linked) a hydrogel with 83% by weight of water.

The hydrogels a) and b) are finished contact lenses.

EXAMPLE 15

Cross-linking of the Polymer of Example 13

A 10% aqueous solution is prepared from the functionalised polymer of Example 13. The solution is introduced into PP moulds having lens geometry and the filled moulds are irradiated for 60 seconds with a 500 W Hg high pressure lamp (for example Oriel type no. 6285).

Cross-linked hydrogels in the form of contact lenses are produced.

EXAMPLE 16

Functionalisation of poly(N-vinylpyrrolidone-stat-methyl methacrylate) with 2-hydroxyethyl methacrylate 4.0 g of the polymer of Example 1 named in the title and 54 mg of hydroquinone are dissolved in 16 g of dimethylacetamide, and 18.22 g (0.14 mol) of 2-hydroxyethyl methacrylate and 23.6 mg (0.037 mmol) of dibutyltin dilaurate are added. The batch is introduced into a distillation apparatus, a weak stream of dried air is passed through the reaction solution and the latter is heated for 18.5 hours at 85° C. The batch is cooled to room temperature and the polymer is precipitated by the addition of approximately 80 ml of acetone. The supernatant solution is decanted and the polymer is dried in a vacuum exsiccator at room temperature and 10 Pa.

Yield: approx. 76% of the monomers used.

The polymer is soluble in $H_2O$, $CH_3OH$ and $C_2H_5OH$ (in each case to the extent of 30% by weight).

EXAMPLE 17

Cross-linking of the Polymer of Example 16

1.00 g of the polymer of Example 16 is dissolved in 2.33 ml of water (approximately 30% by weight), and 16.7 mg of Darocur® 2959 are added. The solution is introduced into a PP mould having lens geometry and the closed mould is irradiated for 1 minute with an Hg high pressure lamp. A hydrogel is produced in the form of a moulding.

EXAMPLE 18

Synthesis of poly(N-vinylpyrrolidone-stat-2-hydroxyethyl methacrylate-stat-2-aminoethyl methacrylate hydrochloride)

15.26 g (0.14 mol) of N-vinylpyrrolidone, 0.22 g (1.67 mmol) of 2-hydroxyethyl meth- acrylate, 0.28 g (0.83 mmol) of a 50 % aqueous solution of 2-aminoethyl methacrylate hydrochloride and 60.55 g of methanol are introduced into a 500 ,1 brown glass three- necked flask having a stirrer, a Claisen attachment and a reflux condenser. The charged apparatus is scavenged with nitrogen via the reflux condensor, the batch is heated under nitrogen to boiling point and a solution of 31.8 mg (0.194 mmol) of AIBN and 1.5 g of methanol is added to the batch via a septum using a syringe. Using two Mikrolab M metering units manufactured by Hamilton, a solution A consisting of 40.0 g (0.36 mol) of N-vinylpyrrolidone, 15.6 g (120 mmol) of 2-hydroxyethyl methacrylate hydrochloride and 232.06 g of methanol is metered in at a rate of 200 µl per minute and a solution B consisting of 79.5 mg (0.48 mmol) of AIBN and 8.95 ml of methanol is metered in at a rate of 9 µl per 99 seconds. After 24 hours, metering is stopped, the batch is stirred for a further 16 hours under reflux, is then cooled to room temperature and the residual monomers and solvent are separated off by ultrafiltration using a 3 kDalton PES (poly-ether sulfone) membrane under an operating pressure of $2.5 \cdot 10^5$ Pa, the solvent being replaced by water.

Yield: approx. 80–85 % of the monomers used.

The polymer dissolves at a room temperature in $H_2O$, $CH_3OH$ and $C_2H_5OH$ (in each case to the extent of 30 % by weight).

EXAMPLE 19

Functionalism of poly(N-vinylpyrrolidone-stat-2-hydroxyethyl methacrylate-stat-2-aminoethyl methacrylate hydrochloride)

1.0 g of the polymer of Example 18 is dissolved in 2.33 ml of water. The solution is titrated with 0.1N sodium hydroxide solution to pH 10, and then 0.036 g (0.23 mmol) of isocyanatoethyl methacrylate is added, with stirring. The reaction conversion is monitored by recording the pH value (pH-monitoring).

EXAMPLE 20

Cross-linking of poly(N-vinylpyrrolidone-stat-2-hydroxyethyl methacrylate-stat-2-aminoethyl methacrylate hydrochloride) functionalised with isocyanatoethyl methacrylate 16.7 mg of Irgacure 2959® are added to the aqueous polymer solution of Example 19 and then the batch is introduced into PP moulds having lens geometry. The closed PP moulds are then irradiated for 10 seconds with a 500 W Hg high pressure lamp. Finished contact lenses are thus obtained in the form of hydrogels having a water content of approximately 85%.

What is claimed is:

1. A process for the preparation of a water-soluble cross-linkable copolymer having a desired copolymer composition, wherein a vinyl lactam (a) and at least one further vinyl monomer (b) of a different type selected from the group consisting of hydrophobic, hydrophilic and functional vinyl monomers are present in said copolymer in the form of statistically distributed building blocks in accordance with the Lewis-Mayo equation; said process comprising the steps of placing a first monomer mixture (I) the composition of which gives the desired copolymer composition in accordance with the Lewis-Mayo equation in a reaction vessel, initiating polymerisation with an initiator and, after polymerisation has been initiated, metering in a second monomer mixture (II) the composition of which corresponds to the desired copolymer composition and the metering speed is in accordance with the consumption of the monomers such that the concentration of the monomers and ratio of the monomers are constant during the reaction.

2. A process according to claim 1, wherein the concentration of the monomers is kept constant during the reaction by reducing in a linear manner the metering speed of the monomer mixture (II) in accordance with the increasing time of the reaction.

3. A process according to claim 1 wherein the concentration of the monomers is kept constant during the reaction by metering in the initiator in a constant linear manner during the reaction.

4. A hydrogel article produced by crosslinking in a mould a copolymer produced by the process according to claim 1 in aqueous solution.

5. A hydrogel according to claim 4 that is a contact lens.

6. A process for the preparation of a hydrogel article wherein said hydrogel article is produced by crosslinking a copolymer produced by the process according to claim 1 in aqueous solution in a mould.

7. A process according to claim 6 wherein the concentration of the aqueous solution corresponds to the final water content of the hydrogel.

8. A process according to claim 6 wherein the crosslinking is effected with UV light.

9. A process according to claim 6 wherein the hydrogel is a contact lens with a final water content and a final geometry.

10. A contact lens comprising a copolymer produced by the process according to claim 1 wherein said copolymer is crosslinked.

11. A process according to claim 1, wherein a functional vinyl monomer is present in said copolymer as a building block, said copolymer is modified with a reactive vinyl monomer (c), the reactive group of said reactive vinyl monomer (c) reacting with the functional group of said functional vinyl monomer to form a covalent bond and the vinylic group of said reactive vinyl monomer (c) being retained.

* * * * *